United States Patent
Baveja et al.

(10) Patent No.: US 10,079,725 B1
(45) Date of Patent: Sep. 18, 2018

(54) ROUTE MAP POLICIES FOR NETWORK SWITCHES

(71) Applicant: CISCO TECHNOLOGY, INC., San Jose, CA (US)

(72) Inventors: Avni Baveja, San Jose, CA (US); Samar Sharma, San Jose, CA (US); Mitali Parthasarathy, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 325 days.

(21) Appl. No.: 14/796,877

(22) Filed: Jul. 10, 2015

Related U.S. Application Data

(60) Provisional application No. 62/141,714, filed on Apr. 1, 2015.

(51) Int. Cl.
*H04L 12/24* (2006.01)
*H04L 12/751* (2013.01)

(52) U.S. Cl.
CPC ...... *H04L 41/0893* (2013.01); *H04L 41/0813* (2013.01); *H04L 41/0886* (2013.01); *H04L 45/02* (2013.01)

(58) Field of Classification Search
CPC .................................................. H04L 41/0893
See application file for complete search history.

(56) References Cited

U.S. PATENT DOCUMENTS

| | | |
|---|---|---|
| 6,601,084 B1 | 7/2003 | Bhaskaran et al. |
| 6,779,039 B1 | 8/2004 | Bommareddy |
| 6,996,615 B1 | 2/2006 | McGuire |
| 7,284,053 B1 | 10/2007 | O'Rourke |
| 7,415,523 B2 | 8/2008 | O'Rourke |
| 7,542,423 B1 | 6/2009 | Morishige |
| 7,623,455 B2 | 11/2009 | Hilla |
| 7,852,774 B2 | 12/2010 | Shen et al. |
| 8,259,722 B1 | 9/2012 | Kharitonov |
| 8,553,552 B2 | 10/2013 | Hu |
| 8,868,726 B1 | 10/2014 | Tu |
| 8,937,942 B1 | 1/2015 | Li |
| 9,246,998 B2 | 1/2016 | Kumar |
| 2003/0097405 A1 | 5/2003 | Laux |
| 2005/0207420 A1 | 9/2005 | Shanklin |
| 2005/0281205 A1 | 12/2005 | Chandwadkar |
| 2005/0281257 A1 | 12/2005 | Yazaki |
| 2006/0098573 A1 | 5/2006 | Beer |
| 2006/0227705 A1 | 10/2006 | Chandwadkar |
| 2007/0047446 A1* | 3/2007 | Dalal ................ H04L 45/02 370/237 |
| 2007/0165622 A1* | 7/2007 | O'Rourke ............ H04L 12/287 370/389 |
| 2008/0084880 A1 | 4/2008 | Dharwadkar |
| 2009/0135722 A1 | 5/2009 | Boers et al. |

(Continued)

*Primary Examiner* — Sulaiman Nooristany

(57) ABSTRACT

In an example, there is disclosed a computing apparatus for providing an integrated service engine on a network switch, including: one or more logic elements including a protocol engine operable for providing routing policies, including: providing an ADD command, comprising a first ordinal list of operations; and providing a DELETE command, comprising a second ordinal list of operations, wherein the second ordinal list of operations is the ordinal inverse of the first ordinal list of operations.

15 Claims, 10 Drawing Sheets

(56) References Cited

U.S. PATENT DOCUMENTS

| | | |
|---|---|---|
| 2011/0235508 A1 | 9/2011 | Goel |
| 2011/0261811 A1 | 10/2011 | Battestille et al. |
| 2011/0283013 A1 | 11/2011 | Grosser |
| 2012/0163164 A1 | 6/2012 | Terry |
| 2012/0163180 A1 | 6/2012 | Goel |
| 2012/0188891 A1 | 7/2012 | Valimaa et al. |
| 2012/0246637 A1 | 9/2012 | Kreeger |
| 2012/0303809 A1 | 11/2012 | Patel |
| 2013/0044636 A1 | 2/2013 | Koponen |
| 2013/0235868 A1 | 9/2013 | Owens |
| 2013/0272305 A1 | 10/2013 | Lefebvre |
| 2013/0343408 A1 | 12/2013 | Cook |
| 2014/0019602 A1 | 1/2014 | Murthy |
| 2014/0025986 A1 | 1/2014 | Kalyanaraman et al. |
| 2014/0321462 A1 | 10/2014 | Kancherla |
| 2016/0182379 A1 | 6/2016 | Mehra |
| 2016/0251607 A1 | 9/2016 | Kwak |
| 2016/0337244 A1 | 11/2016 | Baveja et al. |

\* cited by examiner

ROUTE MAP POLICIES FOR NETWORK SWITCHES

CROSS REFERENCE TO RELATED APPLICATIONS

This application claims priority to U.S. Provisional Application Ser. No. 62/141,714, filed Apr. 1, 2015, titled "Route Map Policies for Network Switches," which is incorporated by reference in its entirety.

FIELD OF THE SPECIFICATION

This disclosure relates in general to the field of communications and, more particularly, to a system and method for providing automated policy based routing.

BACKGROUND

Data centers are increasingly used by enterprises for effective collaboration, data storage, and resource management. A typical data center network contains myriad network elements including servers, load balancers, routers, switches, etc. The network connecting the network elements provides secure user access to data center services and an infrastructure for deployment, interconnection, and aggregation of shared resources. Improving operational efficiency and optimizing utilization of resources in data centers are some of the challenges facing data center managers. Data center managers seek a resilient infrastructure that consistently supports diverse applications and services. A properly planned data center network provides application and data integrity and, further, optimizes application availability and performance.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

SUMMARY

Figure 1A:
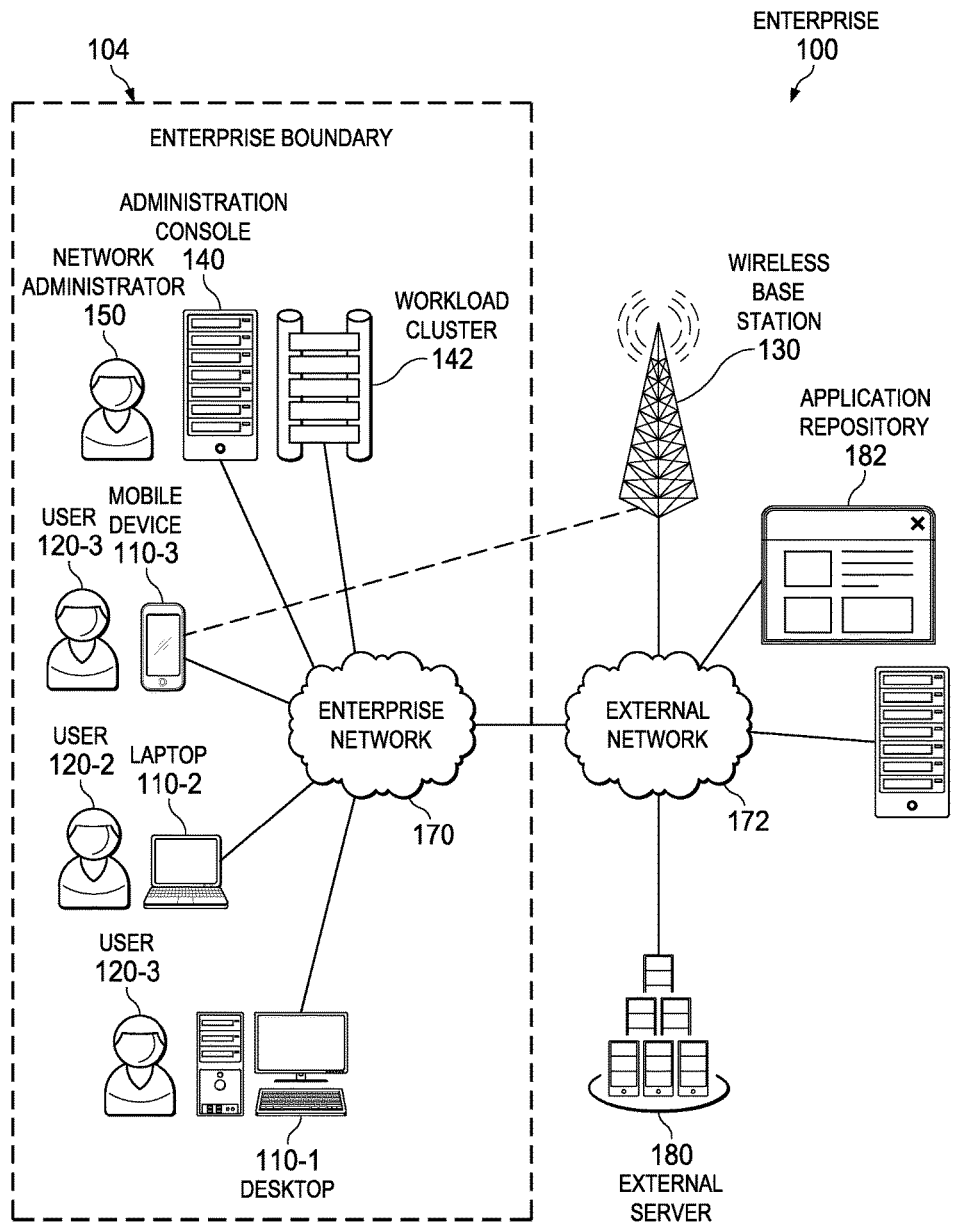
FIG. 1A is a network level diagram of an enterprise computing environment according to one or more examples of the present Specification.

In an example, there is disclosed a computing apparatus for providing an integrated service engine on a network switch, including: one or more logic elements including a protocol engine operable for providing routing policies, including: providing an ADD command, comprising a first ordinal list of operations; and providing a DELETE command, comprising a second ordinal list of operations, wherein the second ordinal list of operations is the ordinal inverse of the first ordinal list of operations

EMBODIMENTS OF THE DISCLOSURE

The following disclosure provides many different embodiments, or examples, for implementing different features of the present disclosure.

Network services are often inserted into a network. The network services may be services not included in the standard IP protocol. For example, the network services may include, by way of nonlimiting example, load balancing or application delivery services. The network services may be performed by one or more service appliances, which may be server blades integrated into network elements (e.g., switches, routers, etc.) or external appliances. The provision of network services typically necessitates manual configuration of network elements and network nodes (e.g., servers).

For example, when providing load balancing or application delivery services, a client device sends a request (e.g., one or more packets) that is intercepted by a service application running on one or more of the service appliances. The service application is configured to select a server among a group of servers to fulfill the request and to transmit the request to the selected server. To ensure that return packets (e.g., packets flowing from the selected server to the client device) are transmitted via the service application, one of the following steps is taken: (1) routing/redirection rules are setup on each of the network elements, (2) the service appliance is configured to perform source network address translation (NAT), or (3) the service appliance is setup as a gateway on each of the servers.

Methods and apparatuses for automating return traffic redirection to a service appliance by injecting forwarding policies in a packet-forwarding element are disclosed herein. An example method for automating return traffic redirection can include: establishing a communication channel between a service appliance and a packet-forwarding element; and transmitting an out-of-band message over the communication channel to the packet-forwarding element. The method steps above can be performed by the service appliance, for example. Additionally, the message can include a forwarding policy that requests the packet-forwarding element to forward predetermined packets to the service appliance.

Optionally, the message can be a policy-based routing (PBR) rule. For example, the PBR rule can include one or more criteria and corresponding forwarding rules. Additionally, the one or more criteria and corresponding forwarding rules can be based on source addresses of the predetermined packets.

In some implementations, the method can further include: receiving a packet having a source address of a client device and a destination address of the service appliance; performing a load balancing algorithm to select a server among one or more servers; changing the destination address of the packet to an address of the selected server; and forwarding the packet having the source address of the client device and the destination address of the selected server. These method steps can also be performed by the service appliance, for example.

In addition, the method can include: receiving a message from the packet-forwarding element indicating a change in network configuration; generating an updated forwarding policy that reflects the change in network configuration; and transmitting an updated out-of-band message over the communication channel to the packet-forwarding element. The message can also include the updated forwarding policy. These method steps can also be performed by the service appliance, for example.

Optionally, the communication channel can be a port channel. Alternatively or additionally, the service appliance can be configured to perform a load-balancing service.

Another example method for automating return traffic redirection can include: establishing a communication channel between a service appliance and a packet-forwarding element; and receiving an out-of-band message over the communication channel from the service appliance. The method steps discussed above can be performed by the packet-forwarding element, for example. Additionally, the message can include a forwarding policy that requests the packet-forwarding element to forward predetermined packets to the service appliance.

Optionally, the message can be a policy-based routing (PBR) rule. For example, the PBR rule can include one or more criteria and corresponding forwarding rules. Additionally, the one or more criteria and corresponding forwarding rules can be based on source addresses of the predetermined packets.

In some implementations, the method can include: receiving a return packet having a source address of a server and a destination address of a client device; determining whether to forward the return packet to the service appliance based on the forwarding policy; and transmitting or not transmitting the return packet to the service appliance based on the determination. These method steps can also be performed by the packet-forwarding element, for example.

Alternatively or additionally, the method can include: transmitting a message to the service appliance indicating a change in network configuration; and receiving an updated out-of-band message over the communication channel from the service appliance. These method steps can also be performed by the packet-forwarding element, for example. In addition, the message can include an updated forwarding policy that reflects the change in network configuration.

Optionally, the method can also include transmitting the out-of-band message to one or more adjacent packet-forwarding elements. This method step can be performed by the packet-forwarding element, for example.

Optionally, the communication channel can be a port channel.

Furthermore, a PBR may include automated PBR (APBR), which allows service appliance to program policies on a switch interface to redirect return traffic to a service appliance set up in "one-arm mode." In one-arm mode, an application control engine (ACE) is configured with a single VLAN that handles both client requests and server responses. In an example, one-arm mode is configured with client-source network address translation (NAT) or PBR to send requests through the same VLAN to the server. Since it is desirable to retain the client IP for the return traffic, the APBR policies may set the "next hop" IP of traffic reaching the switch to the IP of service appliance without modifying the packet. The service appliance may then direct the packet to the client.

In various embodiments, the present Specification provides, by way of nonlimiting example:
 a. A method for Adding/Deleting redirect rules for server traffic.
 b. A method for service appliance high availability (HA).
 c. APBR states and an APBR state machine.
 d. Automatic policy based routing message formats.
 e. VPC support.
 f. Automatic purge of rules on events.

In an example, PBR rules are configured by system administrators to ensure that return traffic from the real server reaches the service appliance. The switch control channel can be used to automate the task of creating PBR rules. The service appliance, as a function of its configuration, knows the IP address of the real servers and sends this information to the switch in a request. The switch in turn creates the PBR rules for the associated switch virtual interfaces (SVIs).

A method for adding redirect rules for server traffic may include:
 a. The APBR request sent by the service appliance includes the real server IP, port and protocol.
 b. On receiving the request, an intelligent service card manager (ISCM) creates an access control list (ACL) using the above attributes for each service appliance nexthop IP and incorporates it into a routemap.
 c. This routemap is applied on the switch interface through which the real server can be best reached.
 d. The interface on which the APBR policy is applied can be a L2 or L3 interface.

In an example, the following method is used for creating an apbr policy:
 a. Create an ACL
  i. Create an ACL with name rise-system-acl-<nexthop ip>-<nexthop interface>. The rule in the ACL contains the protocol, real server (RS) IP, and port. Protocols may include, by way of nonlimiting example, tcp (6), udp (17) or 0. If 0 is sent both tcp and udp rules are installed. An example rule may appear as follows:
IP access list _rise-system-acl-10.1.1.2-Vlan100
10 permit tcp 10.1.1.3/32 eq 8080 any
 b. Create a routemap
  i. Create a routemap with the match clause as the ACL and set clause as the nexthop IP to which the traffic should be redirected. For example, route-map _rise-system-rmap-Vlan100, permit, sequence 1. Match clauses may include, by way of nonlimiting example:
ip address (access-lists): _rise-system-acl-10.1.1.2-Vlan100
Set clauses may include by way of nonlimiting example:
ip next-hop 10.1.1.2
 c. Associate ACL to routemap
 d. Assign service appliance nexthop IP to routemap
 e. Apply the routemap to the rs nexthop interface. For example:
interface Vlan100
ip address 10.1.1.1/24
ip policy route-map _rise-system-rmap-Vlan100 no shutdown
 f. Sequence done/fail.

After the event sequence has reached the done/fail operation, the response_status may be set to RISE_OK, RISE_FAIL, RISE_OK_DUP, RISE_CORRUPT based on the success, failure, duplication, corruption of the apbr policy creation. For responses with RISE_OK_DUP or RISE_CORRUPT, the service appliance should not retry the request and should fix its cache accordingly.

If an event sequence reaches the fail step because of internal error the APBR entry may be marked corrupt. Corrupt entries may not be displayed in 'show rise' command In an example, the following method is used for deleting an APBR policy:
 a. Evaluate deletion
 b. Remove routemap from interface
 c. Delete the routemap
 d. Delete the ACE rule in ACL
 e. Delete the ACL
 f. Sequence Done/Fail Regarding HA and non disruptive appliance failover, during normal operation, APBR add requests may be sent from both the primary and secondary appliance. The switch receives the requests and creates one APBR rule, but internally a reference count of the number appliances (services) using this rule is maintained. When appliance failover happens, the old primary sends a purge request to delete all the APBR rules for that service. The switch then decrements the corresponding reference counts (but does not delete the rule from hardware) and sends a success to the old primary. The old primary (new secondary) then sends an add requests for itself. If the purge was not successful for any reason, the switch sends a failure response and the old primary retries the purge.

Since primary and secondary share the same policy and the policy is only applied once this may save time and resources when both appliances delete the policy.

Regarding the APBR state machine, states may include the following:

Regarding message format, an APBR message may include the following, by way of non-limiting example:
 a. operation mode: op_mode—ADD/DELETE
 b. rs_ipaddr—Real Server Ip Address for ACL rule and this will be used to discover the interface to apply the apbr rule.
 c. rs_port—real server port to match in the ACL.
 d. nexthop_ip—service appliance next hop IP address used as the action for matching the ACLE in the routemap.
 e. protocol—Protocol on which the ACL will be matched.
 f. vlan_id—appliance VLAN ID used to determine the VRF of the real server (RS). In an example, it is assumed that the RS and client are on the same VRF, but not necessarily the default VRF. In other words, if APBR is being used for multi-tenancy with multiple VLANs in difference VRFs, the appropriate VLAN pertaining to that VRF should be sent.

Regarding VNC support, service appliances may recognize VPC connections and send two separate APBR requests to the two peer switches. The peer switches may configure redirect rules separately. and the appliance may manage the different redirection rules sent to peers and correlate the response codes like success and failure from the two peer switches.

Regarding automatic purge of rules on events, the redirect rules may be purged on automatic events tied to the service appliance. These may include, by way of nonlimiting example:
 a. Health Monitoring failure
 b. Appliance reboot triggers a purge message to the switch to remove the rules and empty the policy data base on switch
 c. Forced CLI or user-triggered shutdown of the service
 d. Reboot of the switch In an example, the redirect rules are not purged for transitory events like process restart and supervisor switchover.

TABLE 1

APBR State Machine

| Route_state | Op_mode | Action |
| --- | --- | --- |
| SCM_APBR_ADD_IN_PROGRESS | RISE_ADD/RISE_DELETE | Set response_status as RISE_ADD_IN_PROG; do no processing |
| ISCM_APBR_DEL_IN_PROGRESS | RISE_ADD/RISE_DELETE | Set response_status as RISE_DEL_IN_PROG; do no processing |
| ISCM_APBR_ADD_DONE | RISE_ADD | Set response_status as RISE_OK_DUP; syslog; do no processing |
| ISCM_APBR_CORRUPT | RISE_ADD/RISE_DELETE | Set response_status as RISE_CORRUPT; syslog; do no processing |
| ISCM_APBR_ADD_FAIL | RISE_ADD | Set response status as RISE_FAIL; entry can be retried by appliance |
| ISCM_APBR_DEL_FAIL | RISE_DEL | Set response status as RISE_FAIL; entry can be retried by appliance |

It is further recognized in this specification that deploying an application delivery controller (ADC) in a datacenter requires, in some cases, manual configuration of network elements, such as routers, switches and web server farms. The process of manually configuring redirection rules in the router/switch to handle return traffic from the server and handling updates to the configuration based on the availability of the servers may be tedious, time consuming, and error-prone. In some embodiments, policies may be implemented to optimize, improve, or enhance route map policies for network switches. These may include, by way of non-limiting example:

a. An ordered method of creating redirection rules, wherein the order provides certain advantages. An ordered method of deleting redirection rules is also provided, and in one case, the order for deleting rules is the inverse of the order for creating rules.
b. APBR routing may be based on real server subnetworks.
c. Dynamic configurations are excluded from storage in persistent memory.
d. A method for providing simultaneous add and delete of APBR entries.
e. An optimized purge sequence.

Ordered Creation and Deletion of Redirect Rules

In certain embodiments, creation and deletion of redirect rules can be optimized by following an ordered sequence. For example, removing the routemap from an interface before disassociating it from the ACL reduces the number of PPF sessions opened by the route policy manager (RPM) to create the routemap. Thus, removal of APBR rules happens more quickly if the order of operations is the reverse of the order in which they are added. It should be noted that although order is expressly specified in this embodiment, that does not imply that other operations cannot intervene. For example, for the ordered ADD method, with operations ABC, the operations AXBYCZ may also apply. Regarding the reverse (delete) method, the ordered operations may be CBA, but operations ZCYBXA may also apply. Furthermore, it should be understood that performing operations in order may in some cases imply initiating operations in the correct order without necessarily waiting for one operation to finish before moving on to the next operation. For example, in the ordered list ABC, in one embodiment, A is started and finished, B is started and finished, and C is started and finished. In another embodiment, A is started but possibly not finished, B is started but possibly not finished, and C is started. The operations then finish when they are able.

In certain embodiments, in the case of a switch reload, appliance reloads, or channel breaks, the dynamic APBR configuration has to be purged. This may cause an overload on components that create the ACL and the routemap, causing these purge requests to timeout and leave stale entries in the system. The algorithm to apply redirection rules can be enhanced to contain the intelligence to know if a purge is happening.

In an example, the ADD command comprises the following operations (in order, but non-exclusive):
a. Create ACL (e.g., match a tuple of IP address, port, and protocol).
b. Create a route map (e.g., designate a next-hop IP address).
c. Associate the ACL with the route map.
d. Program the ation.
e. Apply the route map to the interface.

In an example, the DELETE command comprises the following operations (in order, but non-exclusive):
a. Remove route map from interface.
b. Remove action.
c. Remove association.
d. Delete route map.
e. Delete ACL.

APBR Routing Based on Subnetworks

In an example, the ISCC of the present specification may have sufficient intelligence to compress redirection rules bases on the subnet. In an embodiment, when the switch receives a request, it creates an access control list (ACL) using the subnet while maintaining a mapping of subnet to real server IP. The redirection rule is deleted only when all the real servers in the server farm are unavailable. This way multiple redirection rules are compressed into a few rules based on the subnet. In certain embodiments, this significantly reduces the load on ACLMgr and RPM thereby vastly improving processing speeds.

This logic can include receiving a subnetwork definition, for example from the switch, and applying a policy to that entire subnetwork. Alternatively, this can include identifying a group of addresses with a common policy applied to them, grouping those addresses into a subnetwork, and unifying the policy definition for the subnetwork. Advantageously, applying the policy to a new device can then be accomplished simply by assigning the device to the subnetwork.

Non-Persistent Storage of Dynamic Configurations

In an example, the ISE is provided with a persistent storage service (PSS) for storing configuration data. However, configuration data for APBR may be dynamic and and thus may not need to be carried over between reloads. To support this, the ACLMgr and RPM may store a flag to identify dynamic configuration data. Configuration data with this flag may be omitted from the PSS. This saves configuration storage space, and save time for reconfiguration upon reboot. This concept may also be extended to all components storing dynamic configuration to facilitate software-defined networks.

Simultaneous ADD and DELETE of APBR Entries

In certain cases, the load balancer may send to the switch near-simultaneous ADD and DELETE commands for the same policy. For example, the loadbalancer may start an ADD command. Because the operations are, in one example, non-blocking, while the loadbalancer is waiting for a response to the ADD command, the RISE service may go down, so that the loadbalancer then sends a command to DELETE the policy. The switch may receive the DELETE command while still waiting for a response to the "create ACL" command of the ADD operation. In this case, the operating system (OS) may switch contexts and allow the DELETE request to begin processing.

This may require the ADD and DELETE sequences to be aware of each other. In one example, a locking mechanism can be used to allow only one sequence to happen at a time (i.e., ADD must complete before DELETE begins). However, this can be costly in time, as the ADD is five operations long, and thus can, in certain embodiments, take 10 to 15 minutes to complete as different pieces communicate to create the policy. In that case, the time may be totally wasted as the next operation deletes the policy.

To increase efficiency, certain embodiments of the present specification include co-monitoring capability (such as via a messaging interface or "bulletin board" type interface). Thus, the ADD and DELETE can both be aware of the other, and can be provided with intelligence to prevent duplicate work.

In that case, the ADD command may start by creating an ACL. If the DELETE command then intervenes before the ACL creation is complete, the ADD command may self-terminate, and the DELETE command will simply delete the ACL that was created. In other examples, the DELETE command may perform only those operations necessary to undo any operations completed by the ADD command, and may perform them in reverse order.

Optimized Purge Sequence

As described above, a DELETE command may take five operations, each of which comprises sending a message and receiving a response. When a large number of policies are deleted at once, such as when the service is scheduled to go down, this can take prohibitively long. For example, in an enterprise environment with 1,000 policies, up to 5,000 messages must be exchanged to complete all the DELETE commands.

Thus, the present specification also provides for a PURGE command. The PURGE command is an abbreviated two-operation form of delete, with only one message exchanged. In PURGE, the switch is instructed to delete the entire access list, and to delete the entire route map. Deleting the entire route map inherently deletes all associations and ACLs. Thus, for 1,000 policies, only 1,000 messages are required (fewere if some policies share ACLs or routemaps).

A system and method for providing an integrated service engine will now be described with more particular reference to the attached FIGURES. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments many have different advantages, and no particular advantage is necessarily required of any embodiment.

In some embodiments, hyphenated reference numerals, such as 10-1 and 10-2, may be used to refer to multiple instances of the same or a similar item 10, or to different species of a genus 10.

FIG. 1A is a network-level diagram of a secured enterprise 100 according to one or more examples of the present Specification. In the example of FIG. 1, a plurality of users 120 operates a plurality of client devices 110. Specifically, user 120-1 operates desktop computer 110-1. User 120-2 operates laptop computer 110-2. And user 120-3 operates mobile device 110-3.

Each computing device may include an appropriate operating system, such as Microsoft Windows, Linux, Android, Mac OSX, Apple iOS, Unix, or similar. Some of the foregoing may be more often used on one type of device than another. For example, desktop computer 110-1, which in one embodiment may be an engineering workstation, may be more likely to use one of Microsoft Windows, Linux, Unix, or Mac OSX. Laptop computer 110-2, which is usually a portable off-the-shelf device with fewer customization options, may be more likely to run Microsoft Windows or Mac OSX. Mobile device 110-3 may be more likely to run Android or iOS. However, these examples are not intended to be limiting.

Client devices 110 may be any suitable computing devices. In various embodiments, a "computing device" may be or comprise, by way of non-limiting example, a computer, workstation, server, mainframe, embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, virtual machine, virtual appliance, or any other electronic, microelectronic, or microelectromechanical device for processing and communicating data.

Client devices 110 may be communicatively coupled to one another and to other network resources via enterprise network 170. Enterprise network 170 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of nonlimiting example. Enterprise network 170 may also include one or more servers, firewalls, routers, switches, security appliances, antivirus servers, or other useful network devices. In this illustration, enterprise network 170 is shown as a single network for simplicity, but in some embodiments, enterprise network 170 may include a large number of networks, such as one or more enterprise intranets connected to the Internet. Enterprise network 170 may also provide access to an external network, such as the Internet, via external network 172. External network 172 may similarly be any suitable type of network.

A network administrator 150 may operate an administration console 140 to administer a workload cluster 142 and to otherwise configure and enforce enterprise computing and security policies.

Enterprise 100 may encounter a variety of "network objects" on the network. A network object may be any object that operates on or interacts with enterprise network 170. In one example, objects may be broadly divided into hardware objects, including any physical device that communicates with or operates via the network, and software objects. Software objects may be further subdivided as "executable objects" and "static objects." Executable objects include any object that can actively execute code or operate autonomously, such as applications, drivers, programs, executables, libraries, processes, runtimes, scripts, macros, binaries, interpreters, interpreted language files, configuration files with inline code, embedded code, and firmware instructions by way of non-limiting example. A static object may be broadly designated as any object that is not an executable object or that cannot execute, such as documents, pictures, music files, text files, configuration files without inline code, videos, and drawings by way of non-limiting example. In some cases, hybrid software objects may also be provided, for example, a word processing document with built-in macros or an animation with inline code. For security purposes, these may be considered as a separate class of software object, or may simply be treated as executable objects.

Enterprise security policies may include authentication policies, network usage policies, network resource quotas, antivirus policies, and restrictions on executable objects on client devices 110 by way of non-limiting example. Various network servers may provide substantive services such as routing, networking, enterprise data services, and enterprise applications.

Secure enterprise 100 may communicate across enterprise boundary 104 with external network 172. Enterprise boundary 104 may represent a physical, logical, or other boundary. External network 172 may include, for example, websites, servers, network protocols, and other network-based services. In one example, a wireless base station 130, an external server 180, and an application repository 182 may be provided on external network 172, by way of nonlimiting example. Wireless base station 130 may be, for example, an LTE base station or other similar device that connects to mobile device 110-3 wirelessly. Wireless base station 130 may in turn communicatively couple to external network 172. External server 180 may be a server that provides web pages, data, or other resources that enterprise users 120 may need to use.

Application repository 182 may represent a Windows or Apple "App Store" or update service, a Unix-like repository or ports collection, or other network service providing users 120 the ability to interactively or automatically download and install applications on client devices 110. In some cases, secured enterprise 100 may provide policy directives that restrict the types of applications that can be installed from application repository 182. Thus, application repository 182 may include software that is not malicious, but that is nevertheless against policy. For example, some enterprises restrict installation of entertainment software like media players and games. Thus, even a secure media player or game may be unsuitable for an enterprise computer. Security administrator 150 may be responsible for distributing a computing policy consistent with such restrictions and enforcing it on client devices 120.

In another example, secured enterprise 100 may simply be a family, with parents assuming the role of security administrator 150. The parents may wish to protect their children from undesirable content, such as pornography, adware, spyware, age-inappropriate content, advocacy for certain political, religious, or social movements, or forums for discussing illegal or dangerous activities, by way of non-limiting example. In this case, the parent may perform some or all of the duties of security administrator 150.

Figure 1B:
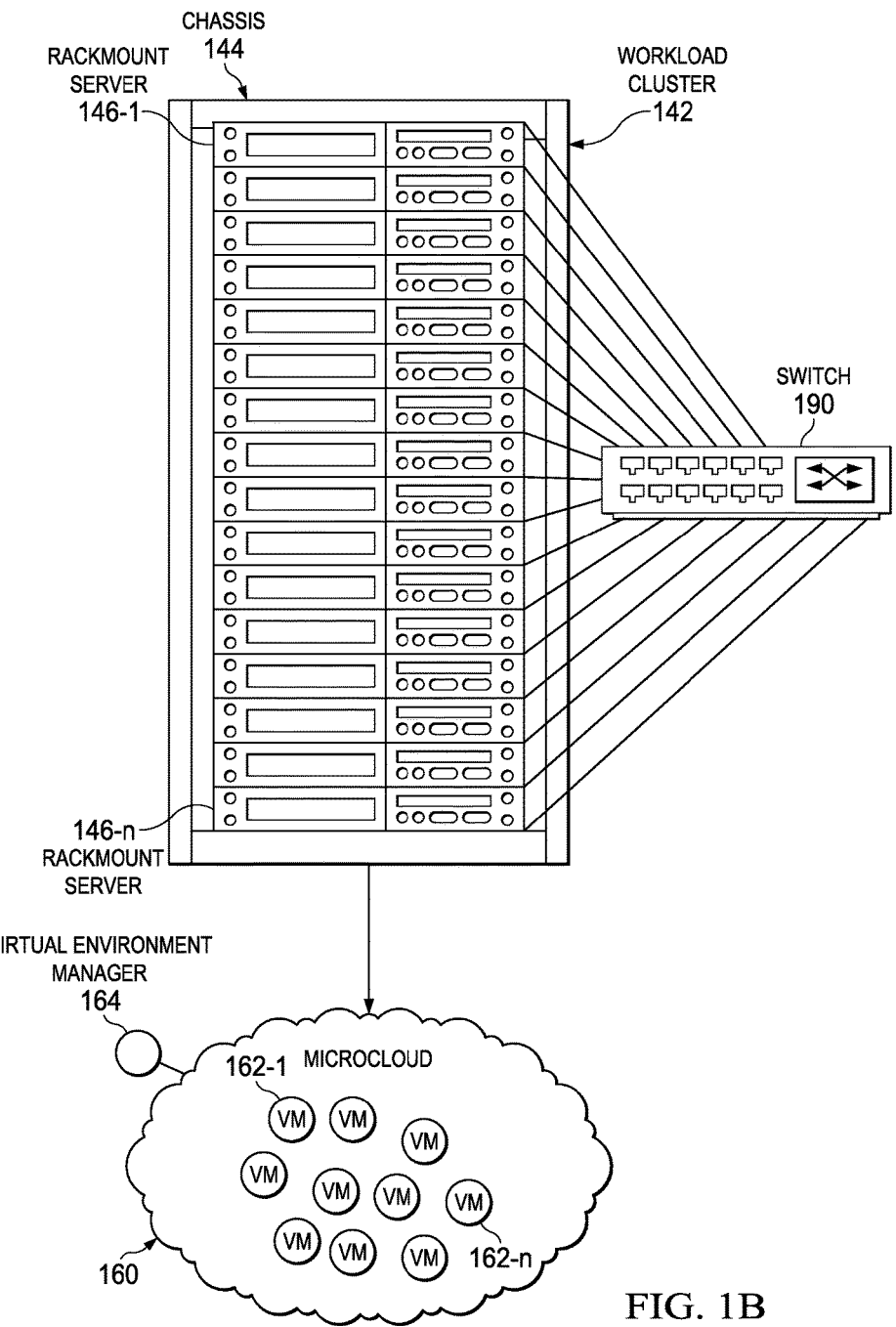
FIG. 1B is a more detailed view of a computing cluster according to one or more examples of the present Specification.

FIG. 1B is a block diagram disclosing a workload cluster 142 according to one or more examples of the present Specification. In this example, workload cluster 142 includes a rack mount chassis 144 which has installed therein a plurality of rack mount servers 146-1 through 146-N. Each rack mount server 146 may be a dedicated appliance, or may be configured with a hypervisor to launch one or more instances of a virtual client.

A switch 190 may be provided to communicatively couple workload cluster 142 to enterprise network 170. As described below, switch 190 may have a number of physical ports for communicatively coupling to rack mount servers 146. In an example, each server 146 has a physical wired connection, such as an Ethernet connection, to a single port of switch 190.

In some cases, some or all of rack mount servers 146-1 through 146-N are dedicated to providing a microcloud 160. Microcloud 160 may be a single purpose or dedicated cloud providing a particular service. For example, microcloud 160 may be configured to serve a website, provide communication systems such as one or more 4G LTE services, or any other appropriate service. In some cases, microcloud 160 is provided as a "tenant" on workload cluster 142. Workload cluster 142 may provide a virtual environment manager 164, which may be responsible for enforcing tenant boundaries between one or more microcloud tenants 160, and for dynamically provisioning virtual machines 162 as necessary. Virtual machines 162-1 through 162-N may represent a plurality of instances of a virtual server appliance. In some cases, VMs 162 may also be provided in different flavors. For example, some VMs 162 may be provisioned as firewalls, others may be provisioned as antivirus scanning appliance, and yet others may provide other auxiliary functions, in addition to VMs 162 provisioned as workload servers.

When switch 190 is provisioned with a load-balancing engine, the load-balancing engine is responsible for keeping track of the number and virtual IP (VIP) of workload servers, so that it can properly route traffic to the workload servers. In the case where each rack mount server 146 is a standalone appliance, switch 190 may maintain a table of the VIP of each rack mount server 146. In cases where workload servers are provided in a microcloud 160, switch 190 may provide a table that maps the VIP of each VM to a VIP assigned to the physical rack mount server 146 on which that VM 162 resides. Thus, switch 190 may include logic not only for routing the packet to the correct rack mount server 146, but also for directing the packet to the correct VM 162 on that rack mount server 146.

Figure 2A:
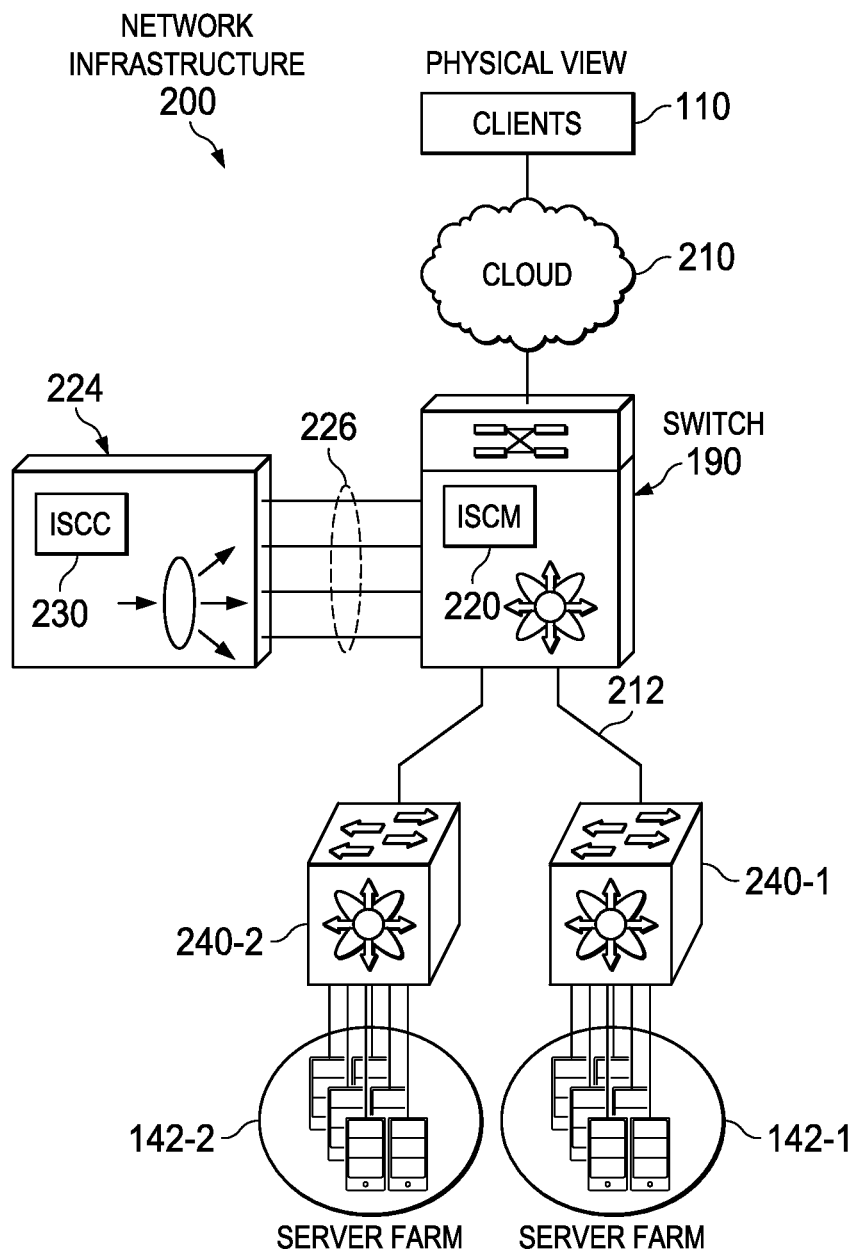
FIG. 2A is a is a simplified schematic diagram illustrating a physical view of a system for providing service appliances in a network environment according to one or more examples of the present Specification.
Figure 2B:
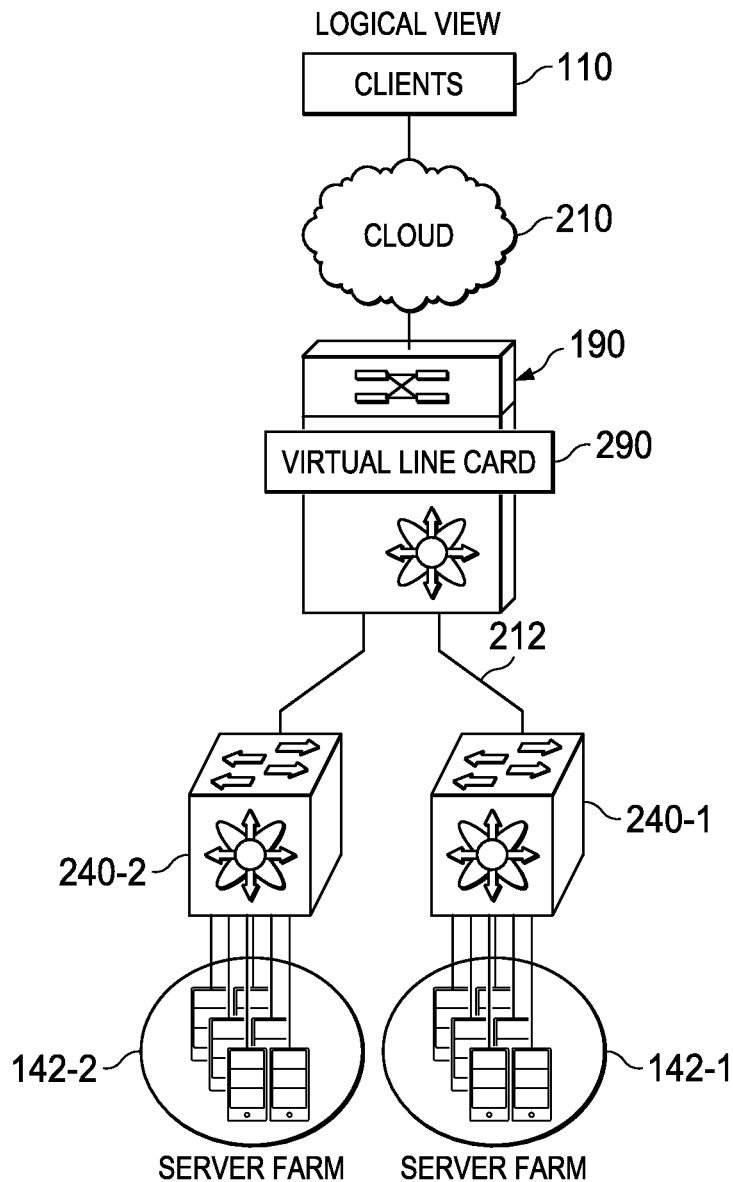
FIG. 2B is a simplified schematic diagram illustrating a logical view of the system according to one or more examples of the present Specification.

FIGS. 2A and 2B show examples of a system architecture for providing service appliances in a network environment, and specifically, providing service appliances as virtual line cards in a network switch. The virtual line card allows the service appliances to be located anywhere in the network, but other ways of providing the service appliance (e.g., directly connecting the service appliance on the switch) are also possible. It is noted that the examples are merely illustrative and are not intended to be limiting. Other architectures and configurations are envisioned by the disclosure.

FIG. 2A is a simplified schematic diagram illustrating a physical view of a system 110 for providing service appliances in a network environment. FIG. 2A includes a network (illustrated as multiple links 212) that connects one or more server farms 142-1 and 142-2 to one or more clients 110 via a cloud 210. Cloud 210 may encompass any public, semi-public, and/or private networks including enterprise networks, an Internet or intranet, community networks, etc. Individual servers in server farm 142-1 and 142-2 may communicate within the same farm via switches 240-1 and 240-2, respectively. Servers in server farm 142-1 may communicate with servers in server farm 142-2 via a switch 190 in this particular example implementation.

A service appliance 224 may connect to switch 190 over a communication channel 226 (e.g., over a port-channel). As used herein, a "communication channel" encompasses a physical transmission medium (e.g., a wire), or a logical connection (e.g., a radio channel, a network connection) used to convey information signals (e.g., data packets, control packets, etc.) from one or more senders (e.g., switch 190) to one or more receivers (e.g., service appliance 224). A communication channel, as used herein, can include one or more communication links, which may be physical (e.g., wire) or logical (e.g., data link, wireless link, etc.). Termination points of communication channels can include interfaces such as Ethernet ports, serial ports, etc. In embodiments of system 110, communication channel 326 may be a single channel: deployed for both control messages (i.e., messages that include control packets) and data messages (i.e., messages that include data packets).

As used herein, a "service appliance" is a discrete (and generally separate) hardware device or virtual machine with integrated software (e.g., firmware), designed to provide one or more network services including load balancing, firewall, intrusion prevention, virtual private network (VPN), proxy, etc. In some cases, switch 190 may be configured with an intelligent service card manager module (ISCM) 220, and service appliance 224 may be configured with a corresponding intelligent service card client module (ISCC) 230. ISCM 220 and ISCC 230 can form part of a Remote Integrated Service Engine (RISE) infrastructure for configuring service appliance 224 on the switch, e.g., as a virtual line card in switch 190.

FIG. 2B is a simplified schematic diagram illustrating a logical view of system 110. In some cases, ISCC 230 and ISCM 220 may be configured to allow service appliance 224 to appear as a virtual line card 290, or some other virtual network node/entity. The terms "line card" and "service module" are interchangeably used herein to refer to modular electronic circuits interfacing with telecommunication lines (such as copper wires or optical fibers) and that offer a pathway to the rest of a telecommunications network. Service appliance is often referred simply as "appliance" or "module" herein. Hence, virtual line card 290 is interchangeable (in certain instances) with ISCM 220. A virtual service module (or a virtual line card) is a logical instance (of a service module) providing the same functionalities (as the service module). Service modules may perform various functions including providing network services (e.g., similar to service appliances). One difference between a service module and a service appliance is that the service module is physically located within a switch, for example, on an appropriate slot. Virtual service modules are similarly configurable within a switch.

In an example, RISE (or comparable technologies) allows (external) service appliances connect to a switch and behave like a service module within a switch without having to take up a physical slot in the switch. RISE helps consolidate how the appliances are provisioned, and enables the appliances to have the benefits of being a service module within the switch. The task for provisioning and configuring of these service appliances is performed mostly by RISE being provided on the switch, making it easy for network administrators to add/remove service appliances in the network.

According to embodiments of the present disclosure, an appliance user can enjoy the same benefit of a service module's simple configuration and operation using the infrastructure of system 110. For example, setting up service appliance 224 for network configurations may be unnecessary. Substantially all such configurations may be made via switch 190, instead of service appliance 224. Service appliance 224 may offload (i.e., transfer) any network (e.g., L2/L3 network) specific control plane and data plane operations to switch 190. Data path acceleration that leverages an application specific integrated circuit (ASIC) (potentially embedded in switch 190) may also be possible in various embodiments. Switch 190 may communicate control messages to service appliance 224 over communication channel 326. Thus, configuration and provisioning of services within service appliance 224 may be implemented via switch 190.

Note that the numerical and letter designations assigned to the elements of FIGS. 2A and 2B do not connote any type of hierarchy; the designations are arbitrary and have been used for purposes of teaching only. Such designations should not be construed in any way to limit their capabilities, functionalities, or applications in the potential environments that may benefit from the features of system 110. For ease of description, only two representative server farms are illustrated in FIGS. 2A and 2B. Any number of server farms and switches may be connected in the network without departing from the broad scope of the present disclosure.

For purposes of illustrating the techniques of system 110, it is important to understand the communications in a given system such as the system shown in FIGS. 2A and 2B. The following foundational information may be viewed as a basis from which the present disclosure may be properly explained. Such information is offered earnestly for purposes of explanation only and, accordingly, should not be construed in any way to limit the broad scope of the present disclosure and its potential applications.

Typically, network services such as load balancing, firewall, intrusion prevention, proxy, virtual private network (VPN), etc. are provided through one or more of the following options: (1) service appliances that connect to network switches and routers; (2) specially designed high-performance routers configured with the services; or (3) network devices such as routers or switches that are configured with service modules that provide the services.

Some service appliances (e.g., load balancers) integrate services such as load balancing, firewall, intrusion prevention, VPN, etc. in a single box format, which is generally based on modular, scalable platforms and which provides a cost-effective option of the three options listed previously. Service appliances may be connected externally to a switch (e.g., aggregate switch or access switch, etc.) via appropriate ports. Different service appliances are designed with specific features applicable to different network environments. The service appliances may be deployed independently to service-specific areas of the network infrastructure, or they may be combined for a layered approach. Service appliances are typically located between the clients and server farms. Data packets generally pass through the service appliances on the way to (and from) the servers/clients. The service appliances may be managed by a management application (e.g., software) on the service appliance that enables configuration settings and other management functions.

Specially designed high-performance routers may also provide network services. Such routers may implement a massive parallel processor hardware and software architecture to deliver integrated network services (e.g., firewall, deep packet inspection, etc.). Many of the functionalities are embedded in a specially designed processor in the router. For example, such a specially designed router can provide an integrated security solution (e.g., stateful packet filtering, intrusion detection and prevention, per-user authentication and authorization, VPN capability, extensive QoS mechanisms, multiprotocol routing, voice application support, and integrated WAN interface support) and routing in a single box.

Network services may also be integrated into a network device (such as a switch or router) using dedicated line cards. The line cards may be installed inside the device, allowing any port on the device to operate as a firewall port, while integrating the services inside the network infrastructure. Several line cards may be installed in the same chassis, providing a modular solution where needed. Such solutions permit the user to take advantage of existing switching and routing infrastructure without any costly upgrades.

Turning to the potential infrastructure of FIGS. 2A and 2B, the example network environment may be configured as one or more networks and, further, may be configured in any form including, but not limited to, local area networks (LANs), wireless local area networks (WLANs), virtual local area networks (VLANs), metropolitan area networks (MANs), wide area networks (WANs), VPNs, Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

Elements of FIGS. 2A and 2B may be coupled to one another through one or more interfaces employing any suitable connection (wired or wireless), which provides a viable pathway for electronic communications. Additionally, any one or more of these elements may be combined or removed from the architecture based on particular configuration needs. System 110 may include a configuration capable of transmission control protocol/Internet protocol (TCP/IP) communications for the electronic transmission or reception of packets in a network. System 110 may also operate in conjunction with a user datagram protocol/IP (UDP/IP) or any other suitable protocol, where appropriate and based on particular needs. In addition, gateways, routers, switches, and any other suitable network elements may be used to facilitate electronic communication between various nodes in the network.

Switches in system 110, including switches 190, 240-1, and 240-2, may include any type of network element connecting network segments. For example, switches 190, 240-1, and 240-2 may include a multi-port network bridge that processes and routes data at a data link layer (Layer 2). In another example, switches 190, 240-1, and 240-2 may process data at a network layer (Layer 3), or Layer 4 (with network address translation and load distribution), or Layer 7 (load distribution based on application specific transactions), or at multiple layers (e.g., Layer 2 and Layer 3). In certain embodiments, functionalities of switches 190, 240-1, and 240-2 may be integrated into other network devices such as gateways, routers, or servers. In various embodiments, switches 190, 240-1, and 240-2 may be managed switches (e.g., managed using a command line interface (CLI), a web interface, etc.).

Communication channel 326 may include a port-channel, which can encompass an aggregation of multiple physical interfaces into one logical interface, for example, to provide higher aggregated bandwidth, load balancing and link redundancy. Communication channel 326 with multiple links can provide a high availability channel: if one link fails, traffic previously carried on this link can be switched to the remaining links. Communication channel 326 may contain up to 16 physical communication links and may span multiple modules for added high availability. In one embodiment, communication channel 326 can represent a port-channel with an aggregation of four point-to-point communication links over multiple ports. In another embodiment, communication channel 326 can represent a virtual port-channel (vPC).

Although FIGS. 2A and 2B show server farms 142-1 and 142-2, it should be appreciated that system 110 is not limited to servers. In fact, any network element may be connected to the network via appropriate switches, where these implementations may be based on particular needs. As used herein, the term "network element" is meant to encompass computers, virtual machines, network appliances, servers, routers, switches, gateways, bridges, load balancers, firewalls, processors, modules, or any other suitable device, component, proprietary element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information. For example, server farms 142-1 and 142-2 may be replaced with LANs connecting desktop computers in a small office. In another example, server farms 142-1 and 142-2 may be replaced with a network of wireless communication devices. In yet another example, server farms 142-1 and 142-2 may be replaced with one or more supercomputers. Various other configurations and devices are contemplated within the broad framework of the present disclosure.

According to embodiments of the present disclosure, system 110 may provide for a fabric extender (FEX)-like protocol, auto-discovery, message transport service (MTS)-like control messages, and defined messages between service appliance 224 and switch 190. Configuration of service appliance 224 may be performed on switch 190 as for a line card. Data path forwarding may be offloaded to network line cards in switch 190. Control path processing may be offloaded to a supervisor engine on switch 190 as appropriate. In embodiments where service appliance 224 has multiple virtual services (e.g., virtual machines), each virtual service may be a separate virtual line card on switch 190.

Figure 3:
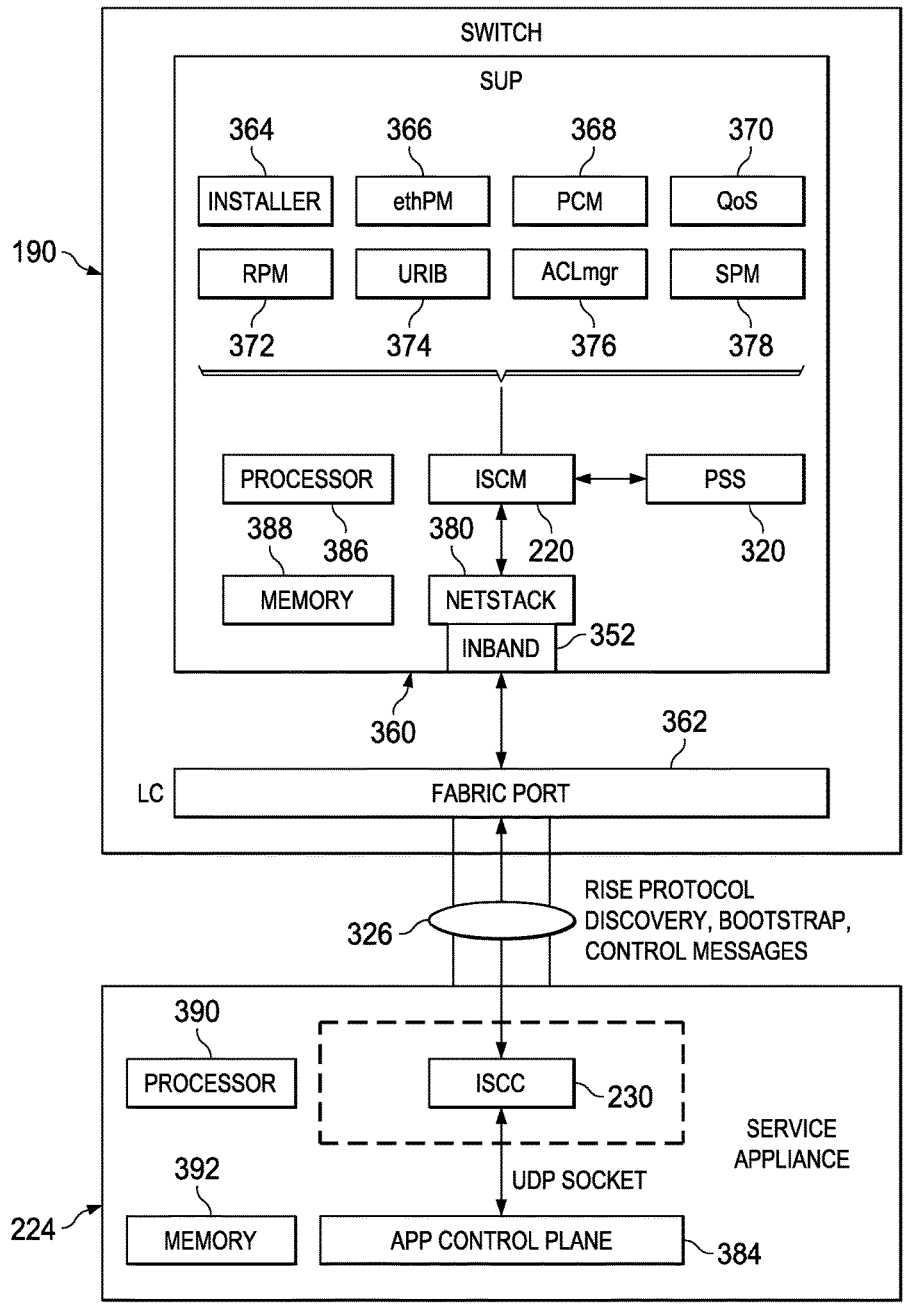
FIG. 3 is a block diagram of a hardware element according to one or more examples of the present Specification.

FIG. 3 is a simplified block diagram illustrating example details of system 110 according to embodiments of the present disclosure. A supervisor engine 360 on switch 190 may communicate with service appliance 224 via a line card including a fabric port 362 that connects point-to-point to a node on service appliance 224. Supervisor engine 360 may include several modules such as an installer 364, an Ethernet port manager (ethPM) 366, a port-channel manager (PCM) 368, a Quality of Service (QoS) element 370, a route policy manager (RPM) 372, a unified/unicast routing information base (URIB) 374, an access control list manager (ACLmgr) 376, and a service policy manager (SPM) 378 for performing various routing and/or management functions. ISCM 220 may be provisioned in supervisor engine 360 to provide RISE related functionalities. ISCM 220 may manage one or more service modules, including in-chassis service modules and remote service modules. A persistent storage service (PSS) 320 may also be provided for persistently storing data between sessions.

In various embodiments, service appliance 224 may support stream control transmission protocol (SCTP) with various addresses (e.g., 127 addresses). In the absence of native SCTP support in supervisor engine 360, tunneling over UDP may be enforced to send SCTP packets. A Netstack module 380 may be provisioned in supervisor engine 360 for implementing TCP/IP stack for received frames hitting the control-plane of supervisor engine 360. Supervisor engine 360 may be configured with an inband port 352, which may be a virtual port that provides an interface for management traffic (such as auto-discovery) to a management processor such as a processor 386.

Each logical block disclosed herein is broadly intended to include one or more logic elements configured and operable for providing the disclosed logical operation of that block. As used throughout this Specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In various examples, a "processor" may include any combination of logic elements, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 386 may be treated as only one core of a multi-core processor, or may be treated as the entire multi-core processor, as appropriate. In some embodiments, one or more co-processor may also be provided for specialized or support functions. In some examples, the processor is a programmable hardware device, which in this Specification expressly excludes a general-purpose CPU.

ISCM 220, in one example, is an engine operable to carry out computer-implemented methods as described in this Specification. It should also be noted that in various embodiments, the following description can apply equally to ISCC 230.

ISCM 220 may include one or more processors, and one or more non-transitory computer-readable mediums having stored thereon executable instructions operable to instruct a processor to provide ISCM and related services. As used throughout this Specification, an "engine" includes any combination of one or more logic elements, of similar or dissimilar species, operable for and configured to perform one or more methods provided by the engine. Thus, ISCM 220 may comprise one or more logic elements configured to provide methods as disclosed in this Specification. In some cases, ISCM 220 may include a special integrated circuit designed to carry out a method or a part thereof, and may also include software instructions operable to instruct a processor to perform the method. In some cases, ISCM 220 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that ISCM 220 may also include other hardware and software, including configuration files, registry entries, and interactive or user-mode software by way of non-limiting example.

In one example, ISCM 220 includes executable instructions stored on a non-transitory medium operable to perform a method according to this Specification. At an appropriate time, such as upon booting switch 190 or upon a command from an operating system or a user 120, ISCM 220 may retrieve a copy of stored instructions from storage and load them into system memory. ISCM 220 may then iteratively execute the instructions to provide the desired method.

In another example, ISCM 220 includes logic executed on an ASIC, FPGA, or other low-level hardware device specifically programmed to carry out the functions of ISCM 220. In one case, any portions of ISCM 220 that are not hard-coded into the logic may be loaded from a firmware or similar memory. In this case, ISCM 220 may operate without the benefit of an operating system, to improve speed and efficiency.

According to various embodiments, ISCM 220 may offer various functionalities such as handling (i.e., accommodating, managing, processing, etc.) RISE messages (e.g., in MTS format), high availability activities, timer events, packet switch stream, American Standard Code for Information Interchange (ASCII) generation, logging, event handling, health monitoring, debugging, etc. ISCM 220 may be a finite state machine utility (FSMU) based application (e.g., which indicates an abstract machine that can be in one of a finite number of states). In various embodiments, ISCM 220 may have a well-defined MTS seamless authentication protocol (MTS SAP) assigned and it can open a socket-based MTS queue and bind to the well-defined SAP such that other processes may communicate with it.

In various embodiments, ISCM 220 may also maintain an array of MTS operation code ("opcode"), which can define how to process a received MTS message. The array may include per-opcode specific MTS flags, handler functions, etc. ISCM 220 may be configured to receive CLI driven MTS messages, MTS notifications (such as event driven messages indicating, for example, that a particular VLAN is up or down), and MTS request/responses. In various embodiments, ISCM 220 may be configured so that MTS-based communication with other processes may be non-blocking and asynchronous. Thus, ISCM 220 may handle multiple events (which can arrive at any time) for the same resource such that the state of the resource is consistent (and not compromised). A similar opcode can be provided even in non-MTS messages, which serves to indicate how to a switch or a service can process the message.

After ports (e.g., appliance ports and switch ports) have been configured in RISE mode, ISCM 220 and ISCC 230 may perform auto-discovery and bootstrap to establish an appropriate control channel. After the control channel is established, applications in service appliance 224 may send control messages (e.g., using the UDP socket interface) to ISCC 230 through an application control plane 384. Application control plane 384 generally encompasses one or more software components for performing workflow management, self-management, and other application control layer processes. ISCC 230 may forward the control messages to ISCM 220 of switch 190 over communication channel 326. In example embodiments, ISCM 220 and ISCC 230 may communicate via UDP packets; however, various other protocols and formats may be accommodated by the teachings of the present disclosure. Supervisor 360 may be provisioned with (or have access to) processor 386 and a memory 388 for performing its various functions. ISCM 220 may use processor 386 and memory 388 to perform RISE related functions in switch 190. Similarly, service appliance 224 may be provisioned with (or have access to) a processor 390 and a memory 392. ISCC 230 may use processor 390 and memory 392 to perform RISE related functions in service appliance 224.

As disclosed herein, RISE includes advanced features, including the following by way of non-limiting example.

Automated Policy-Based Routing

In an example, network administrator 150 configures policy-based routing (PBR) rules to ensure that return traffic from the real server reaches service appliance 224. Switch 190 may be, for example, a Cisco® N7K switch, and a control channel of switch 190 may be used to automate the task of creating PBR rules. Service appliance 224, as a function of its configuration, knows the IP address of the real servers in workload cluster 142, and sends this information to switch 190 in a request. Switch 190 in turn creates the PBR rules for the associated switch virtual interfaces (SVIs).

Figure 4:
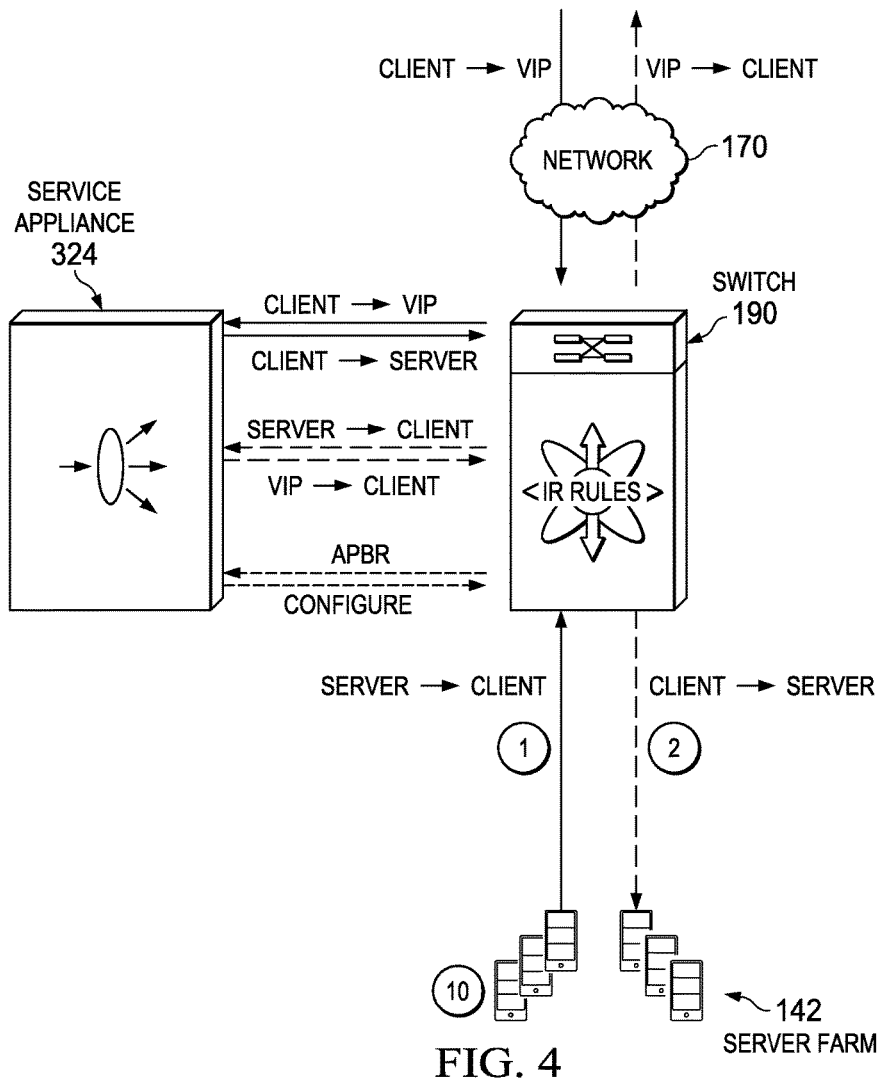
FIG. 4 is a block diagram of a network topology according to one or more examples of the present Specification.

With automated PBR (APBR), service appliance 224 may perform the method illustrated in FIG. 4.

a. Service appliance 224 sends APBR messages to switch 190 after applying the necessary configuration. Service appliance 224 also sends to switch 190 a list of servers (e.g., IPs, ports and protocol) and the IP of the next hop interface.

b. Switch 190 applies the rules for its local servers and propagates the rules for servers attached to the neighboring switch. For the local servers, it creates ACLs and route maps. For non-local servers, it sends APBR messages to other switches.

APBR allows service appliance 224 to program policies on interface facing switch 190 to redirect return traffic to service appliance 224 set up in "one-arm mode." In one-arm mode, an application control engine (ACE) is configured with a single VLAN that handles both client requests and server responses. In an example, one-arm mode is configured with client-source network address translation (NAT) or PBR to send requests through the same VLAN to the server. Since it is desirable to retain the client IP for the return traffic, the APBR policies may set the "next hop" IP of traffic reaching switch 190 to the IP of service appliance 224 without modifying the packet. Service appliance 224 may then direct the packet to the client.

In an example, APBR request sent by service appliance 224 includes the real server IP, port and protocol. On receiving the request ISCM 220 creates an access control list (ACL) using the above attributes for each service appliance's "next hop" IP, and incorporates it into a route map. The route map may be applied on the interface to the switch through which the real server can be best reached. In an example, the interface on which the APBR policy is applied can be any L3 interface.

ISCM

When ISCM 220 receives an APBR message from ISCC 230, an event sequence for APBR is triggered. The payload of the message may be an array of structures containing the following information, by way of nonlimiting example:
a. op_mode—ADD/DELETE
b. rs_ipaddr—"Real server" IP Address for ACL rules. This may be used to discover the interface to apply the APBR rule.
c. rs_port—Port to match in the ACL.
d. nexthop_ip—RISE appliance next-hop IP address, used as the action for matching the ACL in the routemap.
e. protocol—Protocol on which the ACL will be matched.
f. vlan_id—RISE appliance VLAN ID to be used to determine the VRF of the RS. In certain examples, it can be assumed that the RS and client are on the same virtual routing and forwarding (VRF).

In an example, when an APBR bulk message is received, ISCM 220 looks up the APBR entry based on parameters in the request. If the return value is a non-null entry, ISCM 220 performs an action according to the table below, and terminates further processing of the APBR entry.

For all other valid entries, ISCM 220 creates and initializes the context and passes it to the event sequence. In an example, ISCM 220 starts one event sequence for each entry in the bulk message. Each event sequence may operate on one APBR entry, and this information is passed to the different steps in the event sequence via the "index" parameter in the context. A pointer to a counter is set equal to the number of entries in the APBR message and stored in the context. At the event sequence 'done' step for each event sequence, the response_status is set to RISE_OK and the counter is decremented and checked to see if it equals 0.

Figure 5:
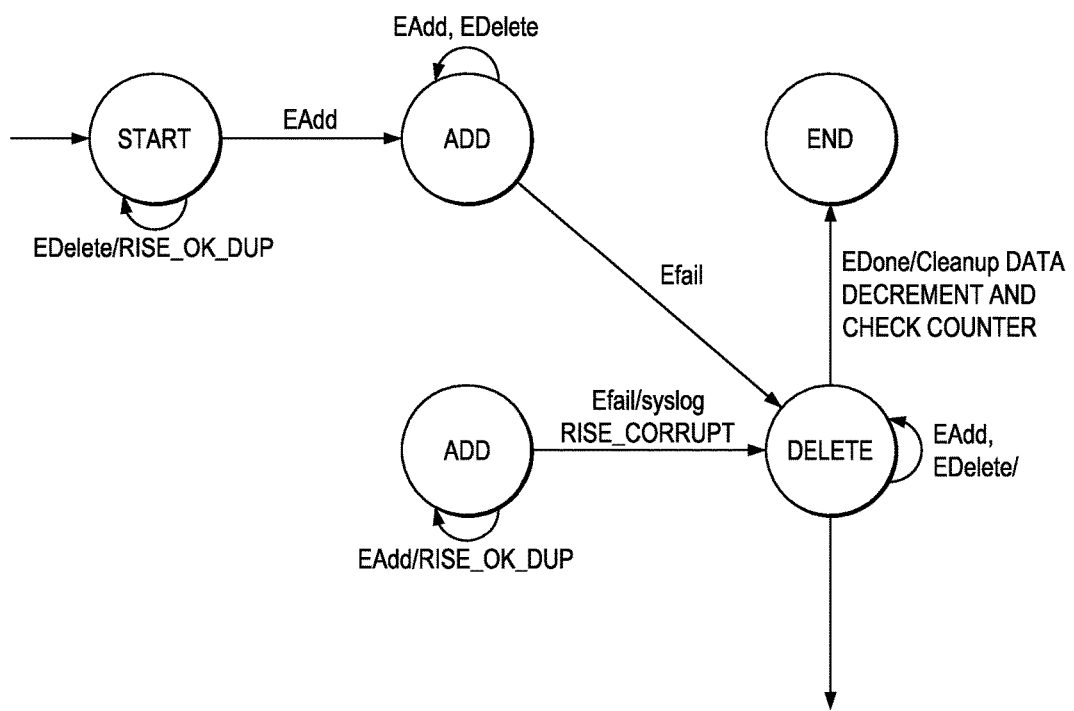
FIG. 5 is a block diagram of a state machine according to one or more examples of the present Specification.

Similarly, at the event sequence 'fail' step the response_status is set to RISE_FAIL/RISE_CORRUPT and the counter is decremented and compared to 0. If an ADD was in progress, the response_status is marked as RISE_RETREAT and delete sequence is started for that entry. This action is a best effort case to remove any partially added APBR configuration. If counter is equal to 0, all the event sequences have completed and a response is sent to service appliance 224. The route_state of the APBR entry may be set according to the state machine diagram of FIG. 5, as explained in more detail in connection with Table 1 above.

Figure 6:
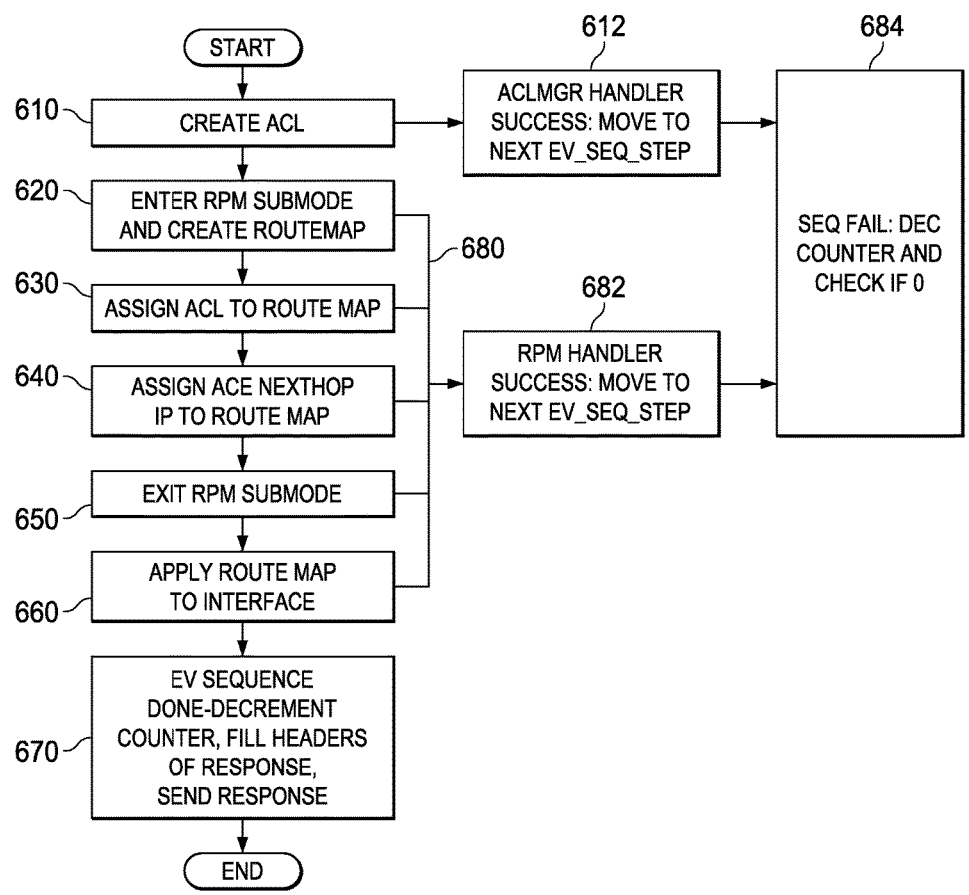
FIG. 6 is a flow chart of a method according to one or more examples of the present Specification.

FIG. 6 is a flow chart of an APBR create/delete event sequence according to one or more examples of the present Specification.

ISCM 220 may also be configured to deal with corrupt state behavior. In an example, ISCM 220 interacts with several components like RPM 372 and ACLMgr 376 to process an APBR entry. One or more of these may encounter internal errors, which may cause the APBR action to fail. To aid in usability and troubleshooting, ISCM 220 may record failures and display them to a user via a user command such as "show." The user may then manually delete the erroneous configuration. Requiring manual user intervention may be useful in certain embodiments because an internal error may indicate a larger issue such as memory corruption or system overload.

In an embodiment, in the case of a failure, the error code is saved in the context of the event sequence and the error is provided to a system logging utility such as the Linux syslog.

The following two error codes may result in the APBR entry being marked as corrupt. Internally, the entry is stored in runtime PSS 320. The number of sequences in apbr_last_seq_map is then decremented, and service appliance 224 receives a RISE_CORRUPT response.

TABLE 2

| ISCM Actions | | |
| --- | --- | --- |
| Route_state | Op_mode | Action |
| ISCM_APBR_ADD_IN_PROGRESS | RISE_ADD/RISE_DELETE | Set response_status as RISE_ADD_IN_PROG; do no processing |
| ISCM_APBR_DEL_IN_PROGRESS | RISE_ADD/RISE_DELETE | Set response_status as RISE_DEL_IN_PROG; do no processing |
| ISCM_APBR_ADD_DONE | RISE_ADD | Set response_status as RISE_OK_DUP; syslog; do no processing |
| ISCM_APBR_CORRUPT | RISE_ADD/RISE_DELETE | Set response_status as RISE_CORRUPT; syslog; do no processing |

SYSERR_ISCM_RPM_ERROR
SYSERR_ISCM_ACL_ERROR

It may also be desirable to mark an APBR entry as corrupt in the case of a timeout at any step of the delete event sequence. If the failure reason is ES_TIMEOUT, then the APBR entry may be removed from a configuration PSS and stored in a runtime PSS.

If a corrupt entry is retried again from a service appliance 224, it may be identified as corrupt by looking up a value such as apbr_avl (a binary tree structure for storing information related to APBR). ISCM 220 may then send back RISE_CORRUPT and not process it again.

Corrupt entries may be displayed to and end user via a command, such as the "show" command mentioned above. In response, a string indicating the reason for the corruption may be displayed.

After switch 190 resets or performs a switchover, all corrupt APBR entries in ISCM 220 may be restored from runtime PSS 320. Since the corrupt entries are not stored in running config PSS, they may be lost on reload or in-service software upgrade (ISSU), in which software is upgraded "hot" (i.e., while in service).

For other ISCM internal failures, the event sequence may be aborted and the state maintained.

In an example, the method of FIG. 6 is used to create an APBR policy.

In block 610, ISCM 220 creates an ACL, for example with the name rise-system-acl-<service_name>-<rs ip>-<rmap seq no>. This may set a permit rule for the given RS, IP, protocol, and source port. These may be specified in an APBR message as rs_ipaddr and rs_port. An example rule may be as follows:

IP access list _rise-system-acl-1-1.1.2.2-1
10 permit 0 1.1.2.2/32 any

In block 612, the ACLMgr reports success for the operation.

In block 620, ISCM 220 enters RPM submode and creates a route map. ISCM 220 may send a request to RPM 372 to enter a submode and create a routemap with the name and sequence number determined in block 610. For example:
route-mapzrise-system-rmap-1-1.1.1.100, permit, sequence 1
Match clauses:
ip address (access-lists): rise-system-acl-1-1.1.2.2
Set clauses:
ip next-hop 1.1.1.100

In block 630, ISCM 220 assigns the ACL to the route map. To do this, ISCM 220 sends a request to RPM 372 to assign an ACL to routemap name and sequence number determined in block 610.

In block 640, ISCM 220 may assign the ACE next hop IP to the route map. To do this, ISCM 220 sends a request to assign a RISE appliance nexthop IP to routemap name and sequence number determined in block 610.

In block 650, ISCM 220 exits RPM submode. Specifically, ISCM 220 sends a request to assign a RISE appliance to exit submode with routemap name and sequence number determined in block 610.

In block 660, ISCM 220 applies the route map to the appropriate RS nexthop interface. ISCM 220 sends a request with routemap name and sequence number determined in block 620 and associates the route map with the RS nexthop interface. For example:
interface Vlan200
 no shutdown
 ip address 1.1.2.1/24
 ip policy route-map rise-system-rmap-1-1.1.1.100

In block 670, the sequence is done. ISCM 220 decrements its "try" counter (the number of times the sequence should be tried before failing), fills a response header, and sends its response.

The response_status may then be set to one of RISE_OK, RISE_FAIL, RISE_OK_DUP, or RISE_CORRUPT based on the success, failure, duplication, or corruption of the APBR policy creation. For responses with RISE_OK_DUP or RISE_CORRUPT, service appliance 224 should not retry the request and may instead fix its cache accordingly.

As seen in metablock 680, If an event sequence fails because of errors returned by RPM 372 or ACLMgr 376, or any of the blocks herein timing out, control may pass to block 682. Block 682 includes an RPM error handler. The APBR entry being processed by the event sequence may then be marked as corrupt. Corrupt entries may not be displayed by a user command such as "show rise status."

A similar process may be used for deleting an APBR policy, and in an example is a functional opposite of adding an APBR policy. This may comprise, for example:
 a. Evaluate the deletion.
 b. Remove the routemap from the interface
 c. Delete the routemap. In this case, ISCM 220 sends a request to RPM 372 to assign an ACL to the routemap name and sequence number determined in operation 1.
 d. Delete the ACE rule in ACL. Here, ISCM 220 sends a request to assign a RISE appliance nexthop IP to the routemap name and sequence number determined in operation 1.
 e. Delete the ACL. ISCM 220 sends a request to assign a RISE appliance to exit submode with the routemap name and sequence number determined in operation 1.
 f. Seq Done/Fail, as appropriate. If needed, ISCM 220 sends a response to service appliance 224 with an error code.

Service appliance 224 may also be configured in an example for high availability (HA). In this case, APBR data structures are stored in the running config PSS and restored on reload/ISSU of switch 190. After ISSU/reload is completed the service data structure is restored. All APBR entries may be purged on reload before bootstrap is initiated. This cleanup removes any stale entries in RPM 372 and ACLMgr 376, to help reduce traffic disruption.

In yet another embodiment, service appliance 224 may include a debug function, accessible via a CLI. In that case, the following commands may be available to an end user, by way of non-limiting example.
 a. Show RISE status
 b. Show system internal RISE ipv4 auto-pbr <slot num>
 c. Show service rise auto-pbr <slot num>ipv4
  i. In an example, this displays the APBR rules per virtual slot
 d. Show system internal ISCM APBR corrupt
  i. In an example, this displays all APBR entries in corrupt state, and the reason for the corruption.

In an example, APBR enablement may require turning off a manual PBR feature in switch 190. This situation may arise where the PBR feature controls the RMAP entries that are PSSed by RPM 172. Disabling PBR removes any RMAP that is applied on an interface, including those applied by APBR.

In an example, upon receiving an APBR request, ISCM 220 may use a feature manager API to check whether or not the PBR feature is enabled. If not, ISCM 220 may print a syslog entry with directions to enable the PBR feature, and then send a RISE_FAIL to service appliance 224. Service appliance 224 may then retry the entry. When PBR is enabled, ISCM may send a pbr_enabled message to service appliance 224, and service appliance 224 may then send a bulk message of APBR entries.

If PBR is disabled, the APBR entries in ISCM 220 are cleaned up and a pbr_disabled message is sent to service appliance 224. Service appliance 224 may then clean up its cache.

Certain embodiments of the present Specification further provide an ACLMgr interface. In one example, existing APIs are used to add and delete dynamic ACLs. An ACLQOS client (a local software component or process) on the virtual line card 290 is responsible for merging various ACLs applied on an interface and applying them, such as in a content-addressable memory (CAM), or ternary content addressable memory (TCAM). A TCAM is a species of memory that is addressed by memory contents rather than address, and which provides very fast searching. A TCAM is a species of CAM in which the search can include "don't care" values that require only part of a search tag to be matched.

Certain configurations may include an option to enable per-entry statistics to prevent the merging of policies. There is not limit on the number of ACLs that can be programmed on an interface, but programming may be rejected with an error if the hardware does not have sufficient resources.

ACLMgr debug commands may include the following, by way of non-limiting example:
  a. Show access-list dynamic
    i. Displays the ACL rules added dynamically by internal APIs An interface to RPM 372 may also be provided. In certain embodiments, PBR rules added by ISCM 220 are not copied to the startup configuration, and are not stored and displayed in an RPM running configuration PSS. Note that this is possible because in certain embodiments, ISCM 220 is a stateless entity. During reload, switchover and reboot, ISCM 220 may retrigger bootstrap and start with a clean database. As a result, APBR rules may not be stored, but stale ACLs and routemaps will continue to persist causing incorrect/inconsistent configuration.

A debug CLI for RPM may include the following, by way of non-limiting example:
  a. Show route-map dynamic
    i. Displays the route-maps added dynamically In certain embodiments, an interface to URIB 374 may also be provided. In this case, ISCM 220 registers with URIB 374 to determine the route and nexthop interface through which switch 190 can reach the real server. The appropriate APIs can be called multiple times to obtain all the nexthop interfaces in the equal cost multipath (ECMP) case. In certain embodiments, ISCM 220 does not detect and update APBR policies for route changes like changes in the RS nexthop interface. A CLI command may be provided to clear all the apbr config in the case of breakage in traffic flow.

ISCC

In certain embodiments, APBR messages are passthrough messages for ISCC 230. ISCC 230 copies the payload from service appliance 224 into a UDP payload and encrypts it. The payload may also be encoded as a type length value (TLV) before it is finally directed to ISCM 220.

After ISCM 220 receives and processes the APBR request, it sends a response to ISCC 230 that is then transparently sent to service appliance 224. Service appliance 224 is responsible for starting a timer and handling failure cases (retrying the request) if it does not receive an ACK in time, as illustrated in FIG. 6.

There can be multiple real servers for which service appliance 224 sends APBR requests to switch 190. These servers can be connected on individual interfaces or may share one or more interfaces with other real servers. The APBR route map may be applied on each nexthop interface to which the real server is connected. If multiple real servers share the same nexthop interface, a consolidated routemap with a separate sequence for each APBR entry may be applied.

In the case of a single APBR entry having multiple nexthop interfaces to the real server, the APBR routemap is applied on each of the nexthop interfaces. When the nexthop interface already has a route map assigned to it, append a sequence to an existing routemap.

Auto PBR Message Structures

In an example, the payload structure of the request and response APBR messages is as follows:

```
typedef struct rise_pbr_msg_t_
{
  u_int8_t op_mode; //see enum rise_op_mode_t
  u_int32_t rs_ipaddr; // real server ip
  u_int16_t rs_port; //real server port
  u_int32_t nexthop_ip; //ip hosted by RISE appliance
  u_int8_t protocol; //real server protocol
  u_int32_t vlan_id; //data vlan to find vrf
} rise_pbr_msg_t;
typedef struct rise_pbr_resp {
  u_int8_t op_mode; //see enum rise_op_mode_t
  u_int32_t rs_ipaddr;
  u_int16_t rs_port;
  u_int32_t nexthop_ip;
  u_int8_t protocol;
  u_int32_t vlan_id;
  u_int32_t response_status; // defines in rise.h
} rise_pbr_response_t;
```

Figure 7:
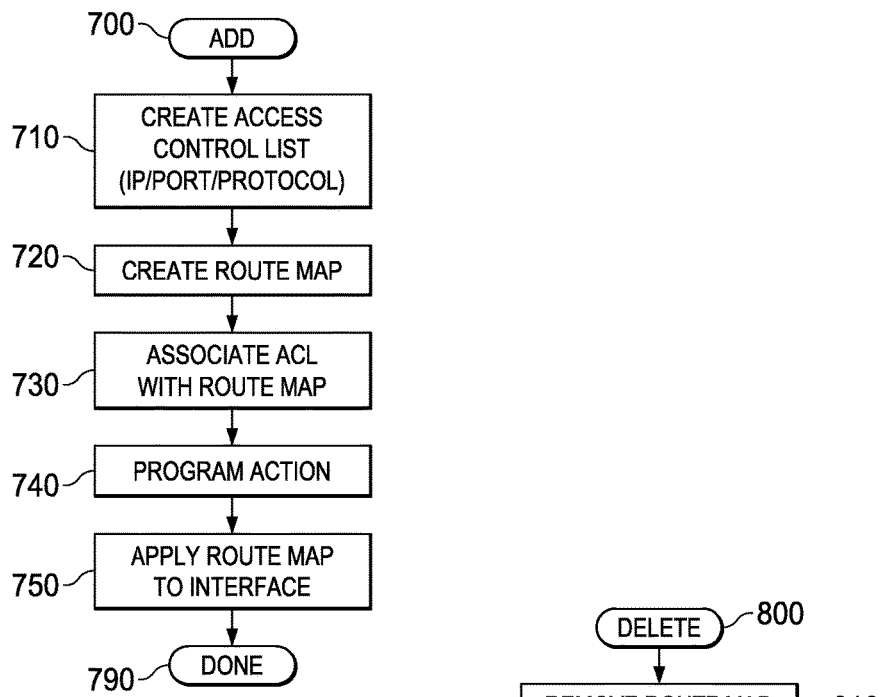
FIG. 7 is a flow chart of a method according to one or more examples of the present Specification.

FIG. 7 is a simplified flow chart 700 of an ADD command, showing more particularly a sequence selected for efficiency. It should be noted that the operations of FIG. 7 have at least some overlap with the operations of FIG. 6, and these FIGURES are not intended to be mutually exclusive.

In block 710, ISCC 230 creates an ACL, including for example a tuple comprising IP address, port, and protocol.

In block 720, ISCC 230 creates a route map.

In block 730, ISCC 230 associates the route map of block 720 with the ACL of block 710.

In block 740, ISCC 230 programs the action.

In block 750, ISCC 230 adds the action to the appropriate interface on switch 190 for handling the rule.

In block 790, the ADD command is done.

Figure 8:
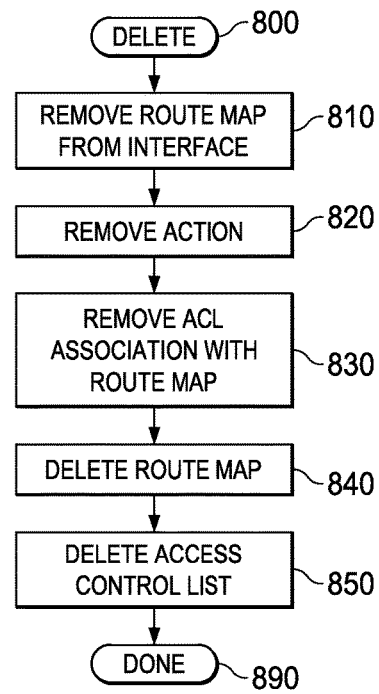
FIG. 8 is a flow chart of a method according to one or more examples of the present Specification.

FIG. 8 is a simplified flow chart 800 of a DELETE command, showing a particular sequence selected for efficiency. It may be noted that the sequence of FIG. 8 is the ordinal inverse of the sequence of FIG. 7.

In block 810, ISCC 230 removes the route map from the interface it is applied to on switch 190.

In block 820, ISCC 230 removes the action for the policy.

In block 830, ISCC 230 removes the ACL association with the route map for the policy.

In block 840, ISCC 230 deletes the route map for the policy.

IN block 850, ISCC 230 deletes the ACL for the policy.

In block 890, the DELETE command is done.

Figure 9:
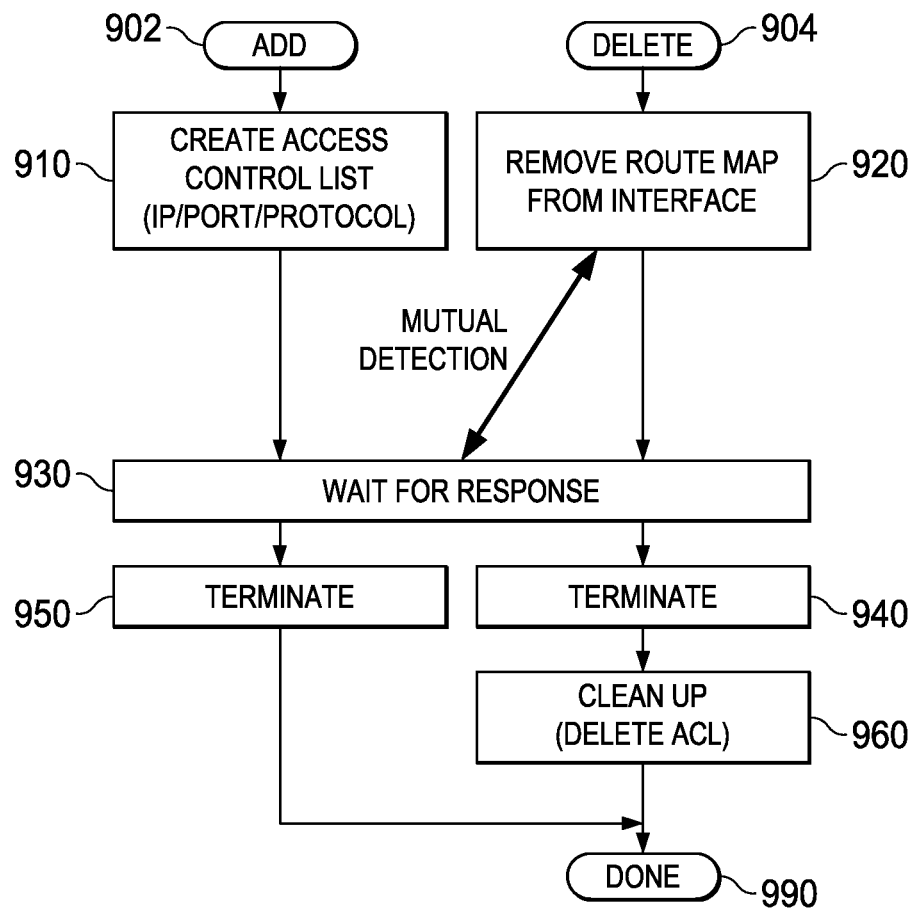
FIG. 9 is a flow chart of a method according to one or more examples of the present Specification.

FIG. 9 is a block diagram showing a near-simultaneous ADD and DELETE for the same policy. As described above, the operations of FIGS. 7 and 9 need not be blocking, so it is possible to encounter a collision between an ADD and DELETE.

For example, in block 902, an ADD command commences.

In block 910, ISCC 230 sends a message to ISCM 220 to create an ACL for the policy.

In block 930, ISCC 230 waits for a response from ISCM 220.

As this is a non-blocking operation, an event may occur, such as service appliance 224 going down, that requires deleting the newly-added policy. Thus in block 904, a DELETE command commences.

In block 920, ISCC 230 sends a message to ISCM 220 to remove the route map for the policy from the interface. However, this request will fail, as the route map has not yet been added to the interface.

In block 930, DELETE command 904 also waits for a response.

Because of the collision, ADD command 902 and DELETE command 904 will mutually detect one another. Both will recognize that the ADD command should be terminated, and the DELETE command should clean up any work done by the ADD command.

Thus, in block 950, the ADD command terminates.

In block 940, the DELETE command terminates normal operation.

In block 960, DELETE command 920 performs any actions necessary to cleanup any work done by ADD command 902. These may be done is reverse order, as in the normal DELETE command, but only necessary operations are performed. In this case, the only operation completed by ADD command 902 was creating the ACL, so the only operation that DELETE command 904 performs is deleting the ACL (normally the last operation it performs).

Similarly, if ADD command 910 had completed the first two of its five operations, DELETE command 920 would perform the last two of its operations. This ensures that policy states are properly preserved, and that orphaned ACLS, route maps, and/or associations are not left on service appliance 224.

By way of example, there is disclose a computing apparatus for providing an integrated service engine on a network switch, comprising: one or more logic elements comprising a protocol engine operable for providing routing policies, comprising: providing an ADD command, comprising a first ordinal list of operations; and providing a DELETE command, comprising a second ordinal list of operations, wherein the second ordinal list of operations is the ordinal inverse of the first ordinal list of operations.

There is further disclosed an example, wherein the first ordinal list of operations comprises: creating an access control list (ACL); creating a route map; associating the ACL with the route map; programming an action for the route map; and applying the route map to a network interface.

There is further disclosed an example, wherein the second ordinal list of operations comprises: removing the route map from the network interface; removing the action; removing the association of the ACL with the route map; deleting the route map; and deleting the ACL.

There is further disclosed an example, wherein the ADD and DELETE commands are non-blocking, and wherein the ADD and DELETE commands are configured to be mutually aware and to synchronize the routing policies upon a collision.

There is further disclosed an example, wherein the protocol engine is further operable for: providing automatic policy-based routing comprising inferring a subnetwork from a group of IP addresses having a common policy; and applying the common policy to the subnetwork.

There is further disclosed an example, wherein the protocol engine is further operable for: providing a persistent storage; flagging a policy as not persistent; and excluding the not persistent policy from the persistent storage.

There is further disclosed an example, wherein the protocol engine is further operable for providing a PURGE command, comprising: deleting a full access list in a single request; and deleting a full route map in a single request.

There is further disclosed an example of one or more tangible non-transitory computer-readable storage mediums having stored thereon executable instructions for providing the computing apparatus of any of the preceding examples, or performing a method according to any of the preceding examples.

There is further disclosed an example of a method comprising performing any or all of the operations disclosed in any of the preceding example.

There is further disclosed an example of an apparatus comprising means for performing the method of any of the preceding examples.

There is further disclosed an example, wherein the means comprise a computing apparatus.

There is further disclosed an example, wherein the means comprise a processor and a memory.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, provisioned in service appliance 224 and/or switch 190 (e.g., through various modules, algorithms, processes, etc.). In some embodiments, one or more of these features may be implemented in hardware, provided external to these elements, or consolidated in any appropriate manner to achieve the intended functionality. Service appliance 224 and/or switch 190 may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, switch 190 and service appliance 224 described and shown herein (and/or their associated structures) may also include suitable interfaces for receiving, transmitting, and/or otherwise communicating data or information in a network environment. Additionally, some of the processors and memories associated with the various network elements may be removed, or otherwise consolidated such that a single processor and a single memory location are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memories (e.g., memory 392, memory 388) can store data used for the operations described herein. This includes the memory being able to store instructions (e.g., as part of logic, software, code, etc.) that are executed to carry out the activities described in this Specification. A processor can execute any type of instructions associated with the data to achieve the operations detailed herein in this Specification. In one example, processors 386 and processor 390 could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, components in system 110 can include one or more memory elements (e.g., memory 388, memory 392) for storing information to be used in achieving operations as outlined herein. These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in system 110 could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, formatting, and protocols, system 110 may be applicable to other exchanges, formats, or routing protocols. Moreover, although system 110 has been illustrated with reference to particular elements and operations that facilitate the communication process, these elements, and operations may be replaced by any suitable architecture or process that achieves the intended functionality of system 110.

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the specification, to limit this disclosure in any way that is not otherwise reflected in the appended claims.

What is claimed is:

1. A computing apparatus for providing an integrated service engine on a network switch, comprising:
one or more logic elements comprising a protocol engine operable for providing routing policies to the network switch, comprising:
providing an ADD command to the network switch, comprising a first ordinal list of operations, wherein the first ordinal list of operations comprises the following sequence of ordered operations performed in order:
(1) creating an access control list (ACL) based on a real server Internet Protocol (IP) address, a port, and protocol received from a service appliance for performing at least one network service;
(2) creating a route map based on the real server IP address, the port, and the protocol received from the service appliance;
(3) associating the ACL with the route map;
(4) programming an action for the route map based on a next-hop IP address for the service appliance performing the at least one network service; and
(5) applying the route map to a network interface;
and
providing a DELETE command to the network switch, comprising a second ordinal list of operations, wherein the second ordinal list of operations comprises the following sequence of ordered operations performed in order:
(6) removing the route map from the network interface;
(7) removing the action;
(8) removing the association of the ACL with the route map;
(9) deleting the route map; and
(10) deleting the ACL,
wherein the second ordinal list of operations is the ordinal inverse of the first ordinal list of operations.

2. The computing apparatus of claim 1, wherein the ADD and DELETE commands are non-blocking, and wherein the ADD and DELETE commands are configured to be mutually aware and to synchronize the routing policies upon a collision.

3. The computing apparatus of claim 1, wherein the protocol engine is further operable for:
providing automatic policy-based routing, the automatic policy-based routing comprising:
inferring a subnetwork from a group of IP addresses having a common policy; and
applying the common policy to the subnetwork.

4. The computing apparatus of claim 1, wherein the protocol engine is further operable for:
providing a persistent storage;
flagging a policy as not persistent; and
excluding the not persistent policy from the persistent storage.

5. The computing apparatus of claim 1, wherein the protocol engine is further operable for providing a PURGE command, comprising:
deleting a full access list in a single request; and
deleting a full route map in a single request.

6. One or more tangible non-transitory computer-readable storage mediums having stored thereon executable instructions for providing a protocol engine operable for providing routing policies to a network switch comprising:
providing an ADD command to the network switch, comprising a first ordinal list of operations, wherein the first ordinal list of operations comprises the following sequence of ordered operations performed in order:
(1) creating an access control list (ACL) based on a real server Internet Protocol (IP) address, a port, and protocol received from a service appliance for performing at least one network service;
(2) creating a route map based on the real server IP address, the port, and the protocol received from the service appliance;
(3) associating the ACL with the route map;
(4) programming an action for the route map based on a next-hop IP address for the service appliance performing the at least one network service; and
(5) applying the route map to a network interface;
and
providing a DELETE command to the network switch, comprising a second ordinal list of operations, wherein the second ordinal list of operations comprises the following sequence of ordered operations performed in order:
(6) removing the route map from the network interface;
(7) removing the action;
(8) removing the association of the ACL with the route map;
(9) deleting the route map; and
(10) deleting the ACL,
wherein the second ordinal list of operations is the ordinal inverse of the first ordinal list of operations.

7. The one or more tangible non-transitory computer-readable storage mediums of claim 6, wherein the ADD and DELETE commands are non-blocking, and wherein the ADD and DELETE commands are configured to be mutually aware and to synchronize the routing policies upon a collision.

8. The one or more tangible non-transitory computer-readable storage mediums of claim 6, wherein the protocol engine is further operable for:
providing automatic policy-based routing, the automatic policy-based routing comprising:
inferring a subnetwork from a group of IP addresses having a common policy; and
applying the common policy to the subnetwork.

9. The one or more tangible non-transitory computer-readable storage mediums of claim 6, wherein the protocol engine is further operable for:

providing a persistent storage;
flagging a policy as not persistent; and
excluding the not persistent policy from the persistent storage.

10. The one or more tangible non-transitory computer-readable storage mediums of claim 6, wherein the protocol engine is further operable for providing a PURGE command, comprising:
deleting a full access list in a single request; and
deleting a full route map in a single request.

11. A computer-implemented method of providing a protocol engine for providing routing policies to a network switch, comprising:
providing an ADD command to the network switch, comprising a first ordinal list of operations, wherein the first ordinal list of operations comprises the following sequence of ordered operations performed in order:
(1) creating an access control list (ACL) based on a real server Internet Protocol (IP) address, a port, and protocol received from a service appliance for performing at least one network service;
(2) creating a route map based on the real server IP address, the port, and the protocol received from the service appliance;
(3) associating the ACL with the route map;
(4) programming an action for the route map based on a next-hop IP address for the service appliance performing the at least one network service; and
(5) applying the route map to a network interface; and
providing a DELETE command to the network switch, comprising a second ordinal list of operations, wherein the second ordinal list of operations comprises the following sequence of ordered operations performed in order:
(6) removing the route map from the network interface;
(7) removing the action;
(8) removing the association of the ACL with the route map;
(9) deleting the route map; and
(10) deleting the ACL,
wherein the second ordinal list of operations is the ordinal inverse of the first ordinal list of operations.

12. The computer-implemented method of claim 11, wherein the ADD and DELETE commands are non-blocking, and wherein the ADD and DELETE commands are configured to be mutually aware and to synchronize the routing policies upon a collision.

13. The computer-implemented method of claim 11, wherein the protocol engine is further operable for:
providing automatic policy-based routing, the automatic policy-based routing comprising:
inferring a subnetwork from a group of IP addresses having a common policy; and
applying the common policy to the subnetwork.

14. The computer-implemented method of claim 11, wherein the protocol engine is further operable for:
providing a persistent storage;
flagging a policy as not persistent; and
excluding the not persistent policy from the persistent storage.

15. The computer-implemented method of claim 11, wherein the protocol engine is further operable for providing a PURGE command, comprising:
deleting a full access list in a single request; and
deleting a full route map in a single request.

* * * * *